United States Patent Office 3,740,349
Patented June 19, 1973

3,740,349
CATALYST FOR TREATING COMBUSTION EXHAUST GAS
John S. Negra, South Plainfield, and Abe Warshaw, Matawan, N.J., assignors to Chemical Construction Corporation, New York, N.Y.
No Drawing. Original application June 11, 1970, Ser. No. 45,576, now Patent No. 3,701,822. Divided and this application Nov. 5, 1971, Ser. No. 196,204
Int. Cl. B01j 11/08, 11/22
U.S. Cl. 252—466 J  4 Claims

ABSTRACT OF THE DISCLOSURE

The exhaust gas from internal combustion engines or the like is treated to convert harmful or pollutant components such as nitrogen oxides, carbon monoxide and unburned hydrocarbons to innocuous compounds, by contacting the exhaust gas with a catalyst composition containing nickel, cobalt and manganese in catalytically effective amounts, deposited on a carrier such as alpha alumina.

---

The present case is a division of U.S. patent application No. 45,576 filed June 11, 1970 and now issued as U.S. Pat. No. 3,701,822.

BACKGROUND OF THE INVENTION

Field of the invention

The invention relates to the elimination of deleterious compounds such as nitrogen oxides, carbon monoxide and residual hydrocarbons, which are present in the exhaust gas from internal combustion engines such as diesel engines or gasoline-burning automobile engines, so as to prevent the discharge of the noxious components into the atmosphere, and thereby prevent air pollution. The term internal combustion engine will be understood to encompass other types of combustion devices and engines such as gas turbines or the like.

Description of the prior art

In recent years it has been recognized that the exhaust gas discharged from internal combustion engines is a serious source of air pollution, especially in metropolitan areas. In some cases, a so-called smog is generated due to atmospheric inversions and accumulation of such exhaust gases in the atmosphere. Recent attempts to prevent such air pollution have concentrated on the destruction or elimination of noxious components by catalysis, especially by admixture of secondary air into the exhaust gas followed by catalytic oxidation of residual hydrocarbons, carbon monoxide, etc., in various types of apparatus specially designed for this purpose. Improvements in active catalytic agents for this function are described in U.S. Pats. Nos. 3,053,773; 3,429,656; 3,316,057; 3,398,-101; 3,477,893; 3,476,508 and 3,493,325. A catalytic agent containing nickel or cobalt, and manganese, for the catalytic reaction of naphtha with steam to produce methane, is described in U.S. Pat. No. 3,466,159.

SUMMARY OF THE INVENTION

In the present invention, it has been determined that a catalytic agent containing small but catalytically effective amounts of a synergistic combination of nickel, cobalt and manganese deposited on a carrier is highly effective in treating exhaust gases from internal combustion engines or the like, in order to reduce nitrogen oxides to nitrogen, and also oxidize carbon monoxide and vaporous hydrocarbons to carbon dioxide and water vapor. The manganese will generally be present as manganese oxide, however the nickel and cobalt may be at least partially present as reduced oxides or in the metallic state. In the description and claims infra, catalyst compositions will refer to metallic components in terms of equivalent oxide content, however the metals such as nickel or cobalt may be partially present in actuality as other compounds or as reduced elemental metals or in the metallic state. However, equivalent oxide composition is reported on analysis, as is customary in the art. Similarly, the manganese content may actually be present in practice at least partially as the sub-oxide, however for purposes of analysis and composition terminology the manganese content is reported as equivalent manganese dioxide.

The exhaust gas is passed through a catalyst bed or mass containing nickel oxide, cobalt oxide and manganese dioxide. It has been determined that highly beneficial results are thereby attained, in terms of removal of nitrogen oxides from the exhaust gas by reduction, and removal of carbon monoxide and hydrocarbon vapors by oxidation, due to the synergistic action of the three metallic constituents in the catalyst. The process is carried out most effectively with a catalyst bed having a composition containing (by weight) in the range of from about 6% to 12% equivalent nickel oxide, 1% to 5% equivalent cobalt oxide and 0.5% to 3% manganese dioxide. These catalytic agents will be deposited on a suitable carrier such as alumina, preferably as the alpha form of alumina, or silica, kaolin or magnesia, in some cases together with a suitable binder. In most instances the invention will be practiced with two catalyst beds in series, in which series flow of exhaust gas takes place through the two beds and air which may be preheated is injected into the partially reacted exhaust gas between beds. A typical apparatus for carrying out the process is described in U.S. patent application No. 33,359 filed Apr. 30, 1970, now U.S. Pat. No. 3,656,915. A temperature level generally in the range of 300° C. to 800° C. will usually be provided in the catalyst beds during reaction, however the invention may be practiced at lower temperatures, such as when starting a cold automobile engine, or at temperatures above 800° C.

It is an object of the present invention to provide an improved process and catalyst for treating exhaust gases from internal combustion engines to remove noxious components.

Another object is to prevent air pollution due to the discharge of exhaust gas from internal combustion engines.

A further object is to provide an improved process and catalyst for catalytically reducing nitrogen oxides and oxidizing carbon monoxide and hydrocarbon vapor in the exhaust gas from an internal combustion engine.

An additional object is to provide a synergistic combination of nickel, cobalt and manganese in a catalyst composition for treating the exhaust gas from internal combustion engines.

These and other objects and advantages of the present invention will become evident from the description which follows.

DESCRIPTION OF THE PREFERRED EMBODIMENT AND EXAMPLES

A catalyst composition was prepared in accordance with the present invention. The catalyst was prepared by double impregnation of an alpha alumina (3/16″) carrier with the nitrate salts of the catalytically active metals: nickel (Ni), cobalt (Co) and manganese (Mn). Some ammonium nitrate was also added to assist in the activation procedure. The nitrates are decomposed at 210° C. to 230° C. for a period of at least 24 hours, and preferably 48 hours. Activation is completed by reducing the catalyst at 400° C. to 450° C. with hydrogen. Catalyst compositions were prepared or formulated in a series of tests with equivalent nickel oxide content varying from 6% to 12% by weight, equivalent cobalt oxide content varying from 1% to 5% by weight, and manganese dioxide varying from 0.5% to 3% by weight. Following are the test results.

EXAMPLE I

TABLE I.—COMPOSITION RANGE OF THE CATALYST

| | |
|---|---|
| Percent nickel oxide as NiO | 7.0–11.0 |
| Percent cobalt oxide as $Co_2O_3$ | 2.0–4.0 |
| Percent manganese oxide as $MnO_2$ | 1.0–2.0 |
| Balance aluminum oxide | $Al_2O_3$ |

The performance of the Ni-Co-Mn catalyst of the present invention was tested with synthetic exhaust gas mixtures simulating automobile exhaust gases using non-leaded gasoline, and the catalyst performance was evaluated.

TABLE II.—COMPOSITION RANGE OF THE TEST GAS

| | |
|---|---|
| Percent $CO_2$ | 12–13 |
| Percent CO | 2–4 |
| Percent $O_2$ | 0–0.6 |
| $C_6H_{14}$, p.p.m. | 150–1500 |
| NOx, p.p.m. | 1000–2500 |
| Percent $H_2O$ | 11–13 |
| Percent $N_2$ | Remainder |

In the operational procedure, the activity of the catalyst was tested in a two stage ceramic tube reactor. Heat was maintained in the upper portion of the tube with an electric tube furnace and in the lower part by an electric heating tape. The test gas was preheated in the lower part of the tube and mixed with additional air just before entering the second stage of the reactor which was separated from the first stage by a 7.6 cm. bed of inert alundum spheres. The first stage of the reactor consisted of between 5.1 and 6.35 cm. of the catalyst pellets and the second stage consisted of from 3.2 to 5.1 cm. of the same material. Reaction temperatures ranged from 300° C. to 800° C. and space velocities from 8000 to 20,000 v./v./hr.

TABLE III.—STABILITY TEST: Ni-Co-Mn CATALYST

| | |
|---|---|
| Space velocity, v./v./hr. (saturated at 50° C.) | 9600 |
| Total reaction time (hrs.) | 6 |
| Temp. at start of test, ° C. | 500 |
| Maximum temp. reached, ° C. | 800 |
| Temp. at end of test, ° C. | 350 |
| Inlet NOx content (p.p.m.) | 1640 |
| Exit NOx at all temps. (p.p.m.) | <10 |
| Crush strength at completion, lbs. | 60 |

It is evident from the results in Table III that substantially all of the nitrogen oxides (NOx) are removed from the test gas by the catalytic action of the present catalyst, and that the final crush strength at completion is at an acceptable level.

EXAMPLE II

Two-stage reactor performance was tested with the catalyst of Example I, prepared for pollution control in automobile mufflers.

TABLE IV.—SIMULATED AUTOMOBILE MUFFLER

| | |
|---|---|
| Space velocity, v./v./hr. (saturated at 50° C.) | 10,600 |
| Gas temp. inlet to 1st stage, ° C. | 320–335 |
| Gas temp. exit to 2d stage, ° C. | 415–580 |
| Additional air to 2d stage, ml./min | 800 |

Gas analysis:

| Component | Feed test gas | Exit gas analysis range |
|---|---|---|
| Percent $CO_2$ | 13.0 | 14.4–14.6 |
| Percent CO | 2.3 | 0–0 |
| Percent $O_2$ | 0.6 | 0.8–1.8 |
| $C_6H_{14}$, p.p.m. | 490 | 1–40 |
| NOx, p.p.m. | 1,040 | 50–90 |

Duration of tests averaged 4 hours. The catalyst crush strength when charged to reactor was 60# (pounds), crush strength after four hour tests was 70#. When the above test gas was reacted without water saturation, the exit gas showed complete absence of nitrogen oxides at 210° C. inlet gas temperature, and hexane was reduced to 440 p.p.m. (parts per million) from an initial 490 p.p.m.

EXAMPLE III—CATALYST COMPARISON

The Ni-Co-Mn catalyst of the present invention as prepared per Example I was tested for effectiveness versus a coppy-cobalt catalyst, which contained 6.90 to 10.30% CuO, and 0.78 to 1.54% $Co_2O_3$. Following are the comparative test results, in a two stage reactor.

TABLE V.—COMPARISON OF CATALYST PERFORMANCE

| | Ni-Co-Mn catalyst | | Cu-Co catalyst | |
|---|---|---|---|---|
| | Inlet gas | Exit gas | Inlet gas | Exit gas |
| NOx (p.p.m.) | 1,640 | 105 | 1,350 | 215 |
| CO (percent) | 1.97 | 0 | 2.84 | 0 |
| $C_6H_{14}$ (p.p.m.) | 1,140 | 0 | 1,450 | 22 |
| Temperature, ° C. | 425 | 765 | 415 | 770 |
| $O_2$ in exit gas (percent) | | 1.6 | | 1.0 |

The superior effectiveness of the Ni-Co-Mn catalyst of the present invention is evident from Table V.

EXAMPLE IV.—COMMERCIAL SCALE TESTS

As a result of favorable results obtained in bench scale tests, it was concluded that the Ni-Co-Mn catalyst of the present invention exhibited greater activity than standard catalysts in reducing the quantity of gaseous pollutants in simulated auto exhaust gases. The catalyst was therefore made in sufficient amounts to fill auto mufflers for performance evaluation by a major automobile manufacturer. A total of 75 pounds of commercial alpha alumina catalyst carrier was used to prepare forur batches of the Ni-Co-Mn catalyst. Each batch was analyzed and checked for activity. The activity in each case was found to be equal to the small scale preparations previously tested although the metals analysis showed some variation. The composition range of the catalysts is shown in TABLE VI.

TABLE VI.—COMPOSITION RANGE OF CATALYSTS PREPARED FOR COMMERCIAL AUTO MUFFLERS

| | |
|---|---|
| Percent nickel as NiO | 7.64–9.86 |
| Percent cobalt at $Co_2O_3$ | 2.01–2.60 |
| Percent manganese as $MnO_2$ | 0.80–1.65 |
| Percent aluminum as $Al_2O_3$ | 85.89–89.55 |
| Crush strength in pounds | 50#–70# |

TABLE VII.—PERFORMANCE OF Ni-Co-Mn CATALYST IN AUTO MUFFLERS

| | Feed test gas | Test run results | | | |
|---|---|---|---|---|---|
| | | #1 | #2 | #3 | #4 |
| Percent $CO_2$ | 12.80 | 15.60 | 15.60 | 15.8 | 15.0 |
| Percent CO | 2.31 | 0 | 0 | 0 | 0 |
| Percent $O_2$ | 0.60 | 0.80 | 1.40 | 0.9 | 0.5 |
| Percent $N_2$ | 85.28 | 8.560 | 83.00 | 83.3 | 84.5 |
| NOx, p.p.m. | 1,040 | 50 | 70 | 70 | 18 |
| $C_6H_{14}$, p.p.m. | 255 | 27 | 1 | 14 | 14 |
| Inlet gas temperature, ° C. | | 320 | 335 | 380 | 390 |
| Exit gas temperature, ° C. | | 470 | 580 | 550 | 490 |

The reactor was a two-stage tube with air injected into the second stage. Space velocity (v./v./hr.) was 10,600, saturated at 40° C. to 50° C. Following is a summary of pollutants removal.

TABLE VIII.—SUMMARY OF POLLUTANTS REMOVAL, COMMERCIAL SCALE TEST

Carbon monoxide, percent _____ 100
Nitrogen oxides, percent _____ 95.8
Hydrocarbon at $C_6H_{14}$, percent _____ 94.5
Average inlet gas temp., ° C. _____ 356
Average exit gas temp., ° C. _____ 522

In an associated heat stability test, the Ni-Co-Mn catalyst was reacted for 6 hours. The first hour, the temperature did not exceed 500° C. For 4 hours the temperature was maintained between 500° C. and 800° C. Near the completion of the test, the temperature was decreased to 350° C. At all temperature levels, the nitrogen oxides content showed 100% removal from an inlet concentration of 1640 p.p.m. The crush strength of the catalyst averaged 70 pounds at the end of the test, indicating good heat stability and resistance to spalling or thermal disintegration.

EXAMPLE V.—ELIMINATION OF POLLUTANTS FROM AUTO EXHAUSTS

The tests were made on a conventional car engine. The exhaust gases issuing from the standard muffler were analyzed and compared to the analysis of the gases when the catalytic muffler was installed.

All data was recorded when the exit gases reached temperatures between 350° C. and 400° C.

TABLE IX.—SINGLE STAGE PERFORMANCE (HOT CYCLES)

| | Standard muffler | Catalytic muffler |
| --- | --- | --- |
| Hydrocarbons (p.p.m.) | 65 | 19 |
| Carbon monoxide (percent) | 0.54 | 0.09 |
| Nitrogen oxides (p.p.m.) | 460 | 176 |

The results show that the hydrocarbon and carbon monoxide emissions would pass the projected 1980 emission standards.

The nitrogen oxides would pass the 1975 emission standard.

TABLE X.—TWO STAGE MUFFLER PERFORMANCE (HOT CYCLES)

| | Standard muffler | Two stage muffler |
| --- | --- | --- |
| Hydrocarbons (p.p.m.) | 126 | 13 |
| Carbon monoxide (percent) | 5.3 | 0.4 |
| Nitrogen oxides (p.p.m.) | | 100 |

The nitrogen oxides emission was slightly higher than the projected 1980 standard. The hydrocarbon and carbon monoxide emissions would meet the 1980 specifications.

We claim:
1. A catalyst composition for the treatment of exhaust gas from an internal combustion engine which comprises between about 6% to 12% by weight of nickel as equivalent nickel oxide, between about 1% to 5% by weight of cobalt as equivalent cobalt oxide, and between about 0.5% to 3% by weight of manganese oxide, deposited on a carrier.
2. The composition of claim 1, in which said carrier is alpha alumina.
3. The composition of claim 1, in which said nickel and cobalt are at least partially present in said catalyst composition in the form of reduced oxides.
4. The composition of claim 1, in which between about 7.64% to 9.86% by weight of nickel as equivalent nickel oxide is provided, between about 2.01% to 2.60% by weight of cobalt as equivalent cobalt oxide is provided, and between about 0.80% to 1.65% by weight of manganese as equivalent manganese oxide is provided.

References Cited

UNITED STATES PATENTS 3,207,704   9/1965   Stephens et al. _____ 252—471 X
3,466,159   9/1969   Warshaw et al. _____ 252—466 J CARL F. DEES, Primary Examiner U.S. Cl. X.R.

252—471; 423—213